Feb. 6, 1951 G. C. SOUTHWORTH 2,540,839

WAVE GUIDE SYSTEM

Filed July 18, 1940 5 Sheets-Sheet 1

INVENTOR
G. C. SOUTHWORTH
BY
N. A. Ewing
ATTORNEY

Feb. 6, 1951 G. C. SOUTHWORTH 2,540,839

WAVE GUIDE SYSTEM

Filed July 18, 1940 5 Sheets-Sheet 2

INVENTOR
G. C. SOUTHWORTH
BY N. S. Ewing
ATTORNEY

INVENTOR
G. C. SOUTHWORTH
BY
N. A. Ewing
ATTORNEY

Feb. 6, 1951 G. C. SOUTHWORTH 2,540,839

WAVE GUIDE SYSTEM

Filed July 18, 1940 5 Sheets-Sheet 4

INVENTOR
G. C. SOUTHWORTH
BY
N. S. Ewing
ATTORNEY

Feb. 6, 1951 G. C. SOUTHWORTH 2,540,839

WAVE GUIDE SYSTEM

Filed July 18, 1940 5 Sheets-Sheet 5

INVENTOR
G. C. SOUTHWORTH
BY N. S. Ewing
ATTORNEY

Patented Feb. 6, 1951

2,540,839

UNITED STATES PATENT OFFICE 2,540,839

WAVE GUIDE SYSTEM

George C. Southworth, Red Bank, N. J., assignor to Bell Telephone Laboratories, Incorporated, New York, N. Y., a corporation of New York Application July 18, 1940, Serial No. 346,175

31 Claims. (Cl. 250—33.63)

This invention relates to dielectric wave guide systems. Among its various objects is that of providing methods and means whereby in a wave guide system, comprising guide sections, connecting elements, horns and similar components, reflection losses shall be reduced to a minimum. This includes provision for the design of component parts, such as connecting elements and radiating or receiving horns, whereby electrical smoothness may be obtained within these component parts as well as at junction points.

One of the objects of the invention is to provide methods and means whereby a wave guide may be divided into a plurality of branches or a plurality of branches may be combined into a smaller number of branches, all without appreciable reflection losses due to such dispersal or consolidation. Stated in another way, it is the object of the invention to accomplish this in a manner which will leave the system substantially electrically smooth at all points, i. e., with the impedance as measured at any point substantially the same looking in either direction.

Another object is to provide a method and means whereby at a junction point at which one or more branches feed into a different number of branches the junction may be made on the basis of a "series" connection or on the basis of a "shunt" connection, terms which will be more fully defined below.

Still another object of the invention is the provision of certain wave guide elements for use in such dispersals or consolidations, which elements will provide a smooth transition between guide sections of the same characteristic impedance but of different dimensions and different forms or between guide sections of different impedance.

Still a further object is to provide method and means whereby the direction of a guide section may be changed and methods and means whereby the plane of polarization of a transmitted wave may be changed, all without appreciable disturbance to the transmitted wave or serious reflection losses.

The invention will be better understood by reference to the following specification and the accompanying drawings, in which.

Figures 10, 11, 12:
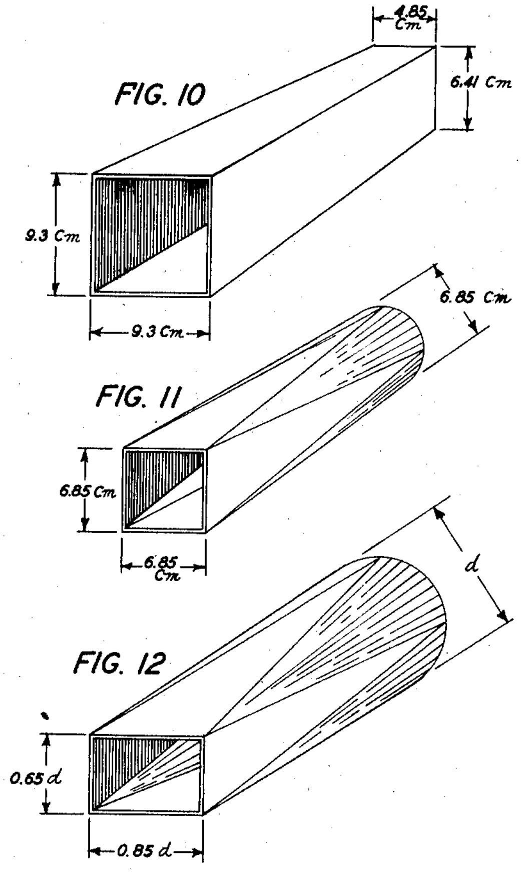
Figure 17:
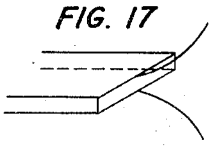
Figure 19:
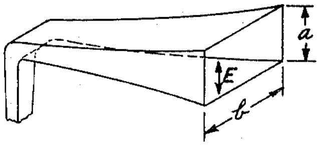
Figure 18:
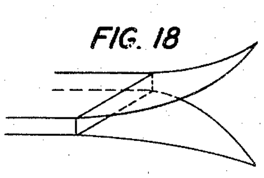
Figures 22, 23, 24, 25, 26, 27:
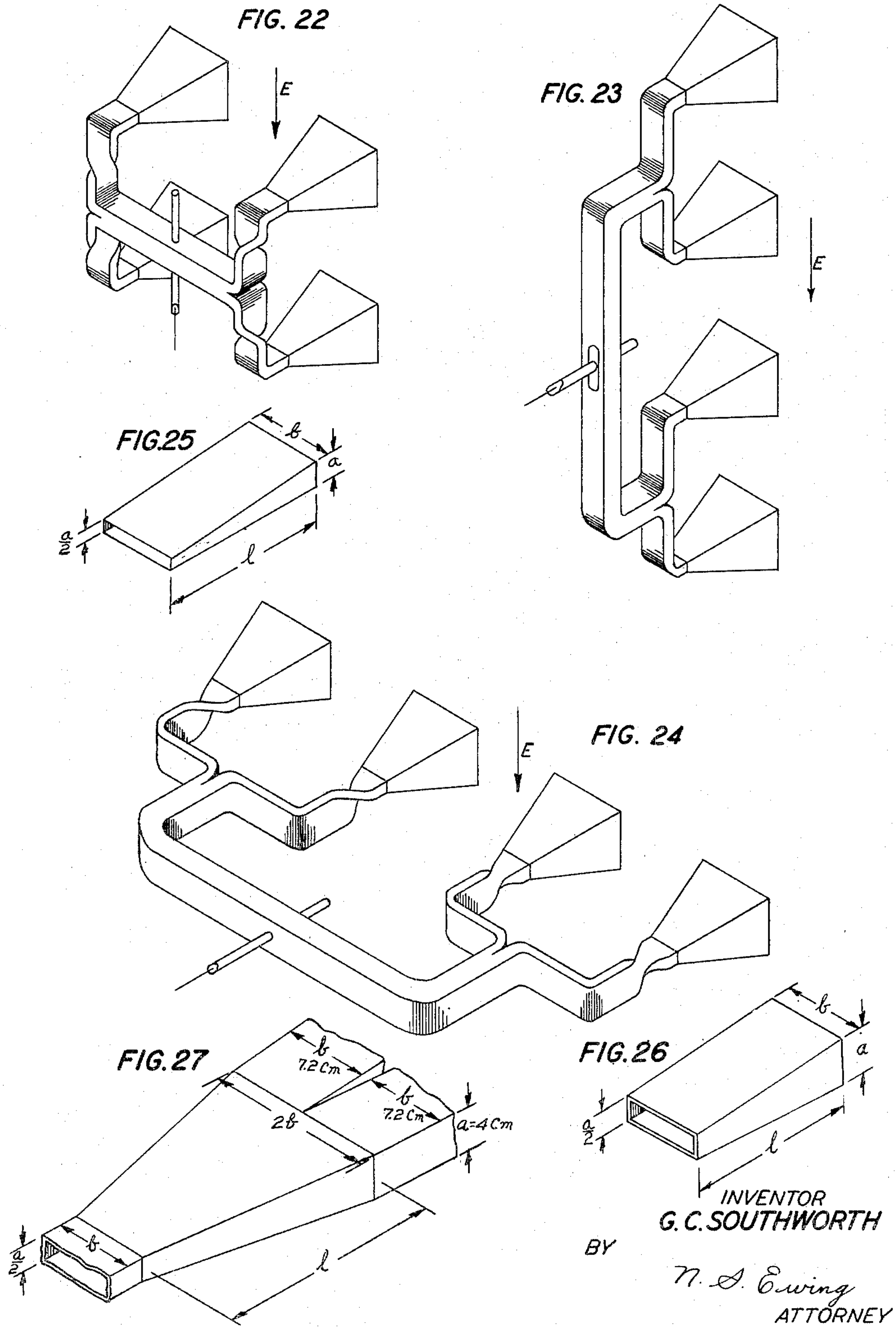
Figure 28:
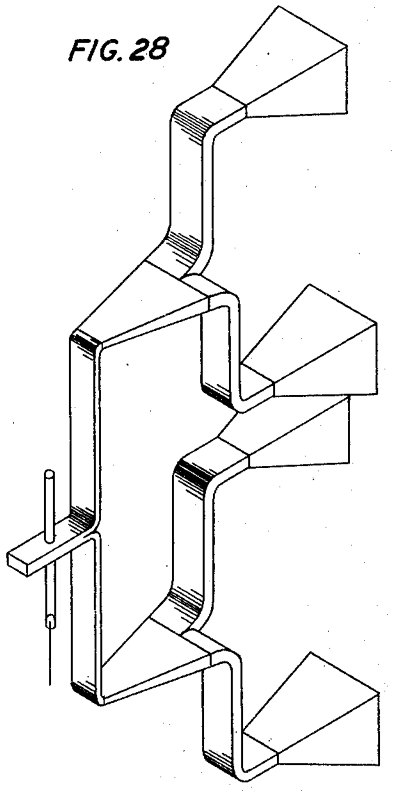
Figure 29:
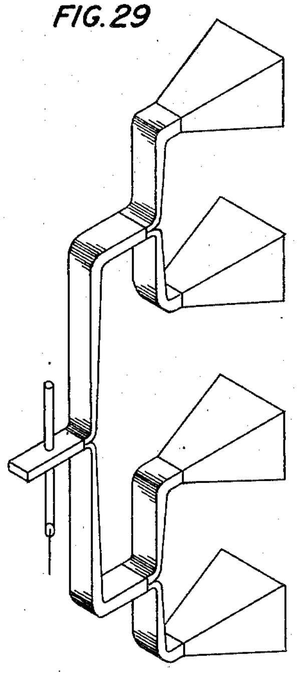
Figure 30:
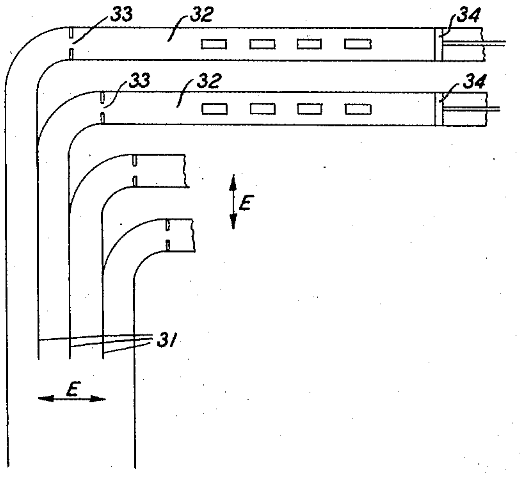

Figs. 4 to 9 relate to changes of direction of a wave by bending or twisting of rectangular guides and to connecting elements with useful properties;

Figs. 10 to 12 show structures adapted for transition from one type of wave guide to another;

Figs. 13 to 16 and 20 to 24 illustrate the applications of my invention to various horn arrays, these arrays being used as radiators or as receivers;

Figs. 17 to 19 illustrate modifications from the type of horn shown in previous figures;

Figs. 25 to 27 represent further connecting elements with useful properties; and Figs. 28 to 30 show applications of my invention to still other horn arrays.

It should be noted at this point that any wave guide element has a property that may be called characteristic or surge impedance and while this quantity may be defined in several different ways, each very good for its own particular purpose, in this particular case I shall define it as the ratio of the Poynting vector to the square of the displacement current in the dielectric medium. It is this quantity which I have in mind in stating that a wave guide element shall be electrically smooth throughout its length, i. e., that the characteristic impedance shall be everywhere the same. Again in speaking of the characteristic impedance at a point in a pipe or a horn I mean that impedance which would be observed were the pipe or horn to continue indefinitely of the same dimensions and characteristics as at that point. In some cases, as will be pointed out hereinafter, the desirable condition of electrical smoothness can be obtained very closely. In cases in which this is not strictly possible, one may accept a reasonable approximation to smoothness or one may use various devices which are akin to transformers as found in wire line communication systems.

The invention to be hereinafter described is applicable to any of the large variety of dielectrically guided waves, but I shall for simplicity confine the description to the case of transverse electric (TE) waves. By this is meant that type of wave in which the electric vector is transverse to the guide and has no longitudinal component while the magnetic vector is at right angles thereto and has a transverse as well as a longitudinal component.

While the characteristic impedance of a wave guide structure will depend upon the type of dielectric wave and the guide structure, it can be shown that for transverse electric waves of the first mode and order (commonly designated at $H_{11}$ waves) in a circular pipe it is given by:

$$Z_0=\frac{353}{\sqrt{1-v_0^2}}\text{ ohms} \qquad (1)$$

where $$V_0=\frac{\lambda}{1.708d}$$

and $d$ and $\lambda$ refer to the diameter and wave-length, respectively, both measured in centimeters. For a rectangular pipe, the equation is:

$$Z_r=\frac{465a}{b\sqrt{1-v_1^2}}\text{ ohms} \qquad (2)$$

where $$v_1=\frac{\lambda}{2b}$$

and $a$ and $b$ refer to the two dimensions of the internal cross-section measured along and perpendicular to the electric force, respectively.

Referring to the equations above, it will be observed that the characteristic impedance of a circular pipe may vary with wave-length from infinity at cut-off, where $\lambda=1.708d$, to 353 ohms for infinitely large pipes. It is of interest that for many of the cases in which wave guides may be used, the characteristic impedance for the round pipe may be of the order of a few hundred ohms.

Examination of the equation for the rectangular pipe indicates that the characteristic impedance may be varied all the way from infinity at cut-off, where $\lambda=2b$, down to zero at $a=0$ or $b=\infty$. It is evident immediately that merely by proportioning $a$ and $b$ we may in the case of rectangular guides obtain any desired characteristic impedance, whereas in the case of a circular pipe we are limited to values above 353 ohms. This degree of flexibilty makes the rectangular pipe very useful, particularly where special requirements are to be met. There are several important special cases of the rectangular pipe that will now be examined.

Referring to Equations 1 and 2 it will be observed that when $v_1=v_0$, the characteristic impedance of the circular and rectangular pipe are related by the simple ratio:

$$\frac{Z_0}{Z_r}=0.759\frac{b}{a} \qquad (3)$$

and that this obtains when $b=0.854d$. This shows that if one is willing to accept a discontinuity of the amount specified, we may be assured that it will remain constant with change of frequency. This fact is of value in connecting rectangular pipes and circular pipes. In addition, if one makes $$\frac{a}{b}=0.759$$

the two characteristic impedances will be equal to each other and union of the rectangular pipe and the circular pipe will be electrically smooth at all frequencies. The proportions of this rectangular equivalent of a circular pipe are:

$$b=0.854d$$
$$a=0.648d=0.759b$$

This unique proportioning of a rectangular guide to make it match a circular guide is an important relationship to which reference will be made hereinafter. An element for such matching is shown in Fig. 12.

It is also to be observed that for a square pipe where $a=b$, Equation 2 reduces to:

$$Z_r=\frac{465}{\sqrt{1-v_1^2}} \qquad (4)$$

If now we again make $b=0.854d$, the characteristic impedance of the circular and square pipes become related by the ratio $$\frac{Z_0}{Z_r}=0.759$$

and this holds for all frequencies. If we make $b=d=0.685\lambda$ we have the condition for the characteristic impedance of a square pipe to be equal to its inscribed circular pipe. Under this circumstance $Z_r=Z_0=678$ ohms. This holds only for the case where $\lambda=1.46d$. Consequently, the match can be perfect for one frequency only. An element for joining a circular and a square guide section on this basis is shown in Fig. 11. It will be obvious from what has been said that the characteristic impedance of a semicircular pipe when the electric force is perpendicular to the chosen diameter is:

$$Z_0'=\frac{177}{\sqrt{1-v_0^2}} \qquad (5)$$

where, as before, $v_0=\lambda/1.708d$.

Figure 1:
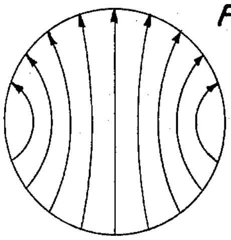
Fig. 1 is a representation of the electric field in a pipe of circular cross-section for a transverse electric wave of the first mode.
Figure 2:
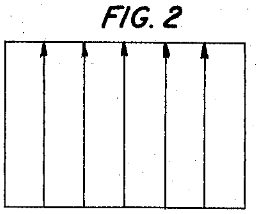
Fig. 2 is the same for a pipe of rectangular cross-section.
Figures 3, 4, 5:
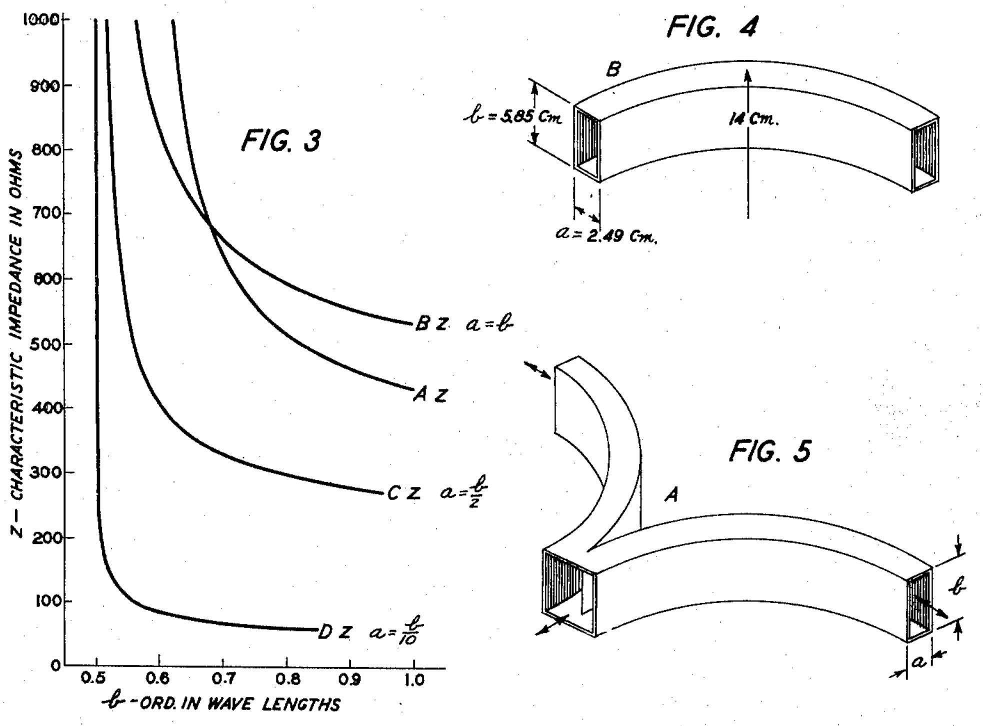
Fig. 3 shows certain characteristic impedance curves.

In order to make the characteristics of both rectangular and circular pipes more evident and also to provide for disclosures that are to follow, there are shown in Fig. 3 characteristic impedance values for various representative cases met with in practice. Curve A gives the impedance curve for a hollow circular pipe as a function of the diameter $d$ measured in wave-lengths. Curve B gives the corresponding data for a square pipe in terms of the length of one side $b$ also measured in wave-lengths. It will be observed that these two curves cross at the point $Z=678$ and $b=d=0.685\lambda$.

The characteristic impedance of a rectangular pipe having a breadth $b$ may be obtained from curve B by multiplying the results there given by $a/b$. In order to bring out the effect of varying the ratio of $a/b$ there are plotted as curve C the values of Z for $$a=\frac{b}{2}$$

and in curve D the case where $$a=\frac{b}{10}$$

While the principles of my invention find practical application in a large variety of dielectric wave guide systems, certain principles of branching will be disclosed here and, for the sake of concreteness, chiefly in connection with the feeder system for an array of electromagnetic horns, this array of horns being applicable either as a transmitter from a source of radiation or as a receptor of electromagnetic waves. Also, we shall in this specification describe the apparatus as though it were being used in reception, although it is to be understood that in every case the array may be used in a reciprocal relation as a transmitter from a source of electromagnetic waves. Furthermore, and again for the sake of concreteness, it will be assumed that wave frequencies of 3000 megacycles ($\lambda=10$ centimeters) are used. It may furthermore be assumed that a fairly broad band of frequencies is to be transmitted, such as for a multiplex of television channels. Also in fabricating a feeder system such as is contemplated, I find certain component parts useful and these will now be described.

In connecting two or more sections of a dielectric wave guide or in connecting together two or more horns, one may use either circular or rectangular metal pipes. However, because of the facility with which, as I have pointed out above, the characteristic impedance of a rectangular pipe may be varied by a change of dimensions the latter has some marked advantages.

It is well known that for the transmission of the first mode of the transverse electric (TE) waves the critical dimension is that which lies perpendicular to the electric force. In the case of a circular pipe there is but one such transverse dimension and because of the symmetry of the cross-section the $TE_{11}$ wave may have any plane of polarization; thus, the circular pipe is not polarization selective. With a rectangular pipe, on the other hand, we may make one of the two transverse dimensions large enough to support the desired wave and the other too small, with the result that the polarization of the desired wave is assured. For the most part, then, in this description the $a$ dimension of the rectangular guide will be kept less than one-half wave-length. However, this rule need not be followed invariably. Fig. 4 shows a component element useful in a wave guide system in which the dimensions in one particular case are:

$$a=2.49 \text{ centimeters}$$
$$b=5.85 \text{ centimeters}$$

The substitution of these values in Equation 2 yields (for a 10-centimeter wave) a characteristic impedance for such a tube of 377 ohms, which is the characteristic impedance of free space. This component element of Fig. 4 is shown as curved, here on a mean radius of about 14 centimeters, and it will be observed that the bending is in the plane of the dimension $a$, that is, in the plane of the electric vector. This bending of a guide is useful in many cases to change the direction of the guide, that is, to change the direction of the flow of power, and will be used in many of the subsequent structures described. Fig. 5 illustrates how two such branches of 377 ohms each may be joined to a single line having a characteristic impedance of 754 ohms to form a reflectionless union of wave power. It will be observed that after joinder the single guide continues with the dimension $b$ unchanged but with the other dimension increased to $2a$.

Such form of branching as is shown in Fig. 5 will be referred to as "series" because of the close similarity between the orientation of the lines of electric force both before and after branching as compared with the case of a series connection of two ordinary wire lines. Thus, if equal waves are traveling in the two branches toward the common branch, there being a potential difference across the two in the $a$ dimension equal to $e$, then upon joinder the total potential drop across the dimension $2a$ will be equal to $2e$. In other words the potential differences across the component pipes add up in series in the resultant pipe. Thus, the displacement current, which is given by the ratio of a potential difference and the impedance, is the same after joinder as it is in the component tubes and the power flowing through the two individual tubes will combine in the single tube without reflection at the junction. While this particular method of joinder is spoken of as a series one, it should be apparent that it is possible to connect two wave guides in parallel. This I have succeeded in doing and reference thereto will be made below.

Figure 6:
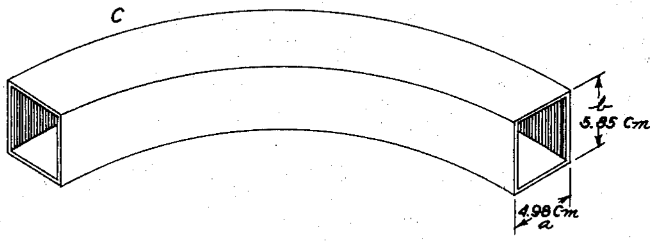

Fig. 5 has been described in terms of power flowing through the two narrow pipes into the single larger one, but it should be understood that power may be flowing from the single branch dividing proportionately between the two branches, again without reflection losses. Thus, this component element may be used for bringing two branches together into one or dividing a single branch into two. Furthermore, as shown in Fig. 6, the element which would be connected to the element of Fig. 5 may itself be bent without serious disturbances so long as the bending is in the plane of the electric vector and is not too sharp. Still further, whereas in Fig. 5 the two components are indicated as having the same dimension $a$ this need not be true. One of the branches may have a dimension $a_1$ and the other a dimension $a_2$, the two then fitting into a single pipe whose one dimension will be $a_1+a_2$ and again there will be joinder without substantial reflection losses.

Figures 7, 8:
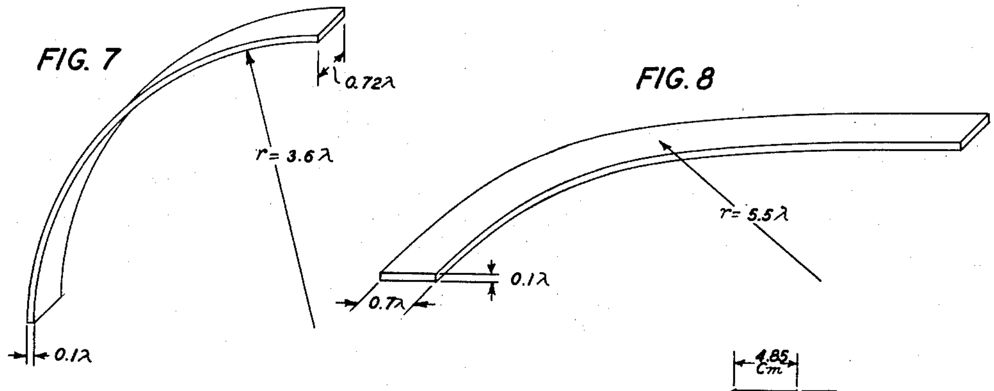

Reference has been made to the fact that the bending of a rectangular guide element shall be in the plane of the electric component. This constitutes an important part of my invention. This phenomenon is illustrated in the guide section of Fig. 7 in which the $a$ dimension is taken as approximately $0.1\lambda$ and the $b$ dimension as approximately $0.7\lambda$, the element being bent on a radius of approximately $3.5\lambda$. Measurements in the laboratory have shown that the reflection introduced by the bending of this element is negligibly small. This was found to be true even though the radius of curvature for the bend were reduced to as small as $0.9\lambda$. If the bend is a sharp right-angle bend still lying in the plane of electric vector, the reflection losses are in the neighborhood of 13 per cent. On the other hand, if the element were bent at right angles to the electric vector, as shown in Fig. 8, the mean radius of curvature being as large as $5.5\lambda$, the reflection losses introduced amount to 9 per cent, this loss increasing appreciably as the radius of curvature becomes smaller.

Figure 9:
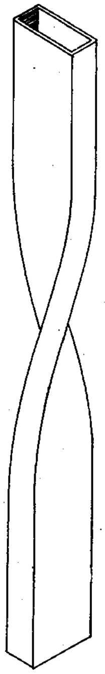

In connection with the design of feeders for horn arrays calling for either dispersal or consolidation of branches, there may be need for rotating the plane of polarization of the transverse electric wave. This may be particularly desirable in order to provide that the bending of a rectangular pipe shall always take place in the plane of the electric vector. Such rotation of the plane of polarization I find can be done very simply by twisting the rectangular pipe about a longitudinal axis through any desired angle, such as shown in Fig. 9. Measurements show that there is a negligible amount of reflection both for the case of 90 degrees of rotation and for 180 degrees of rotation.

In building up such a feeder system as will be described below, it may be desirable to join two different forms of wave guides of different dimensions but of the same characteristic impedance in a manner to provide a substantially reflectionless union. An illustration of an element for such union is shown in Fig. 10 where a square guide whose dimensions are $a=b=0.93\lambda$, having a characteristic impedance of 550 ohms, is to be connected to a rectangular pipe in which $a=0.485\lambda$ and $b=0.641\lambda$, and which also has a characteristic impedance of 550 ohms. The union between the two guide sections should not be made abruptly but one configuration should be faired into the other gradually over a distance of one-half wave-length or more.

A second example of a reflectionless union is shown in Fig. 11. It is the case mentioned above where a circular pipe is connected to a square pipe of such dimensions that $b=d=0.685\lambda$. This gives a characteristic impedance of 678 ohms, holding for one frequency only. For a frequency of 3000 megacycles ($\lambda=10$ cm.) $d$ should be about 6.85 centimeters.

A unique and important case of joining rectangular and circular pipe is one that makes for electrical smoothness at all frequencies. Such a joining element is shown in Fig. 12, the rectangular dimensions being given by $a=0.65d$ and $b=0.85d$. Again, as in all cases, the transition from the one guide section to the other should be gradual, extending over at least one-half wave-length.

Figure 13:
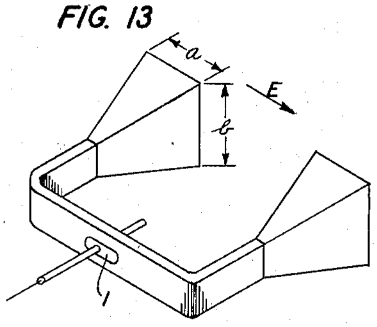
Figure 14:
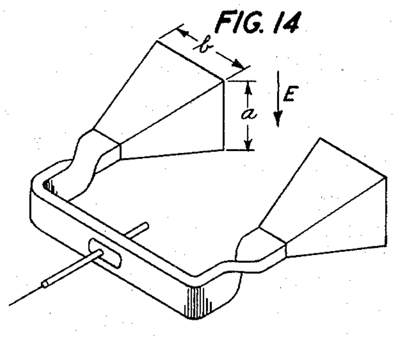

Figs. 13 and 14 show different ways of connecting a pair of horns to a single receiver. In Fig. 13 the electric force is in the plane of the two horns. As a result of this circumstance it may be desirable to provide for a lateral displacement of the receiver relative to the two horns as indicated at 1, for if the two components of wave power are to arrive at the receiver in the same phase the latter must be located off-center by a quarter wave-length. It will be observed in this figure that the $a$ dimension of the rectangular guide joining the two horns is parallel to the direction of the electric vector of the incoming wave and that this dimension is less than the $b$ dimension. Fig. 14 shows a modification of the scheme of Fig. 13 to permit the two horns to be arrayed in a plane at right angles to the electric force. It will be observed that in order to avoid bends that might lead to reflection losses the electric force is first rotated 90 degrees in each branch by a suitable twist, after which the rectangular guides may be bent and the connection made as in Fig. 13. If one twist is clockwise and the other is counter-clockwise, then for optimum signal the receiver should be located midway between the two horns. If the two twists are identical, the receiver will need to be closer to one horn than the other.

Figure 15:
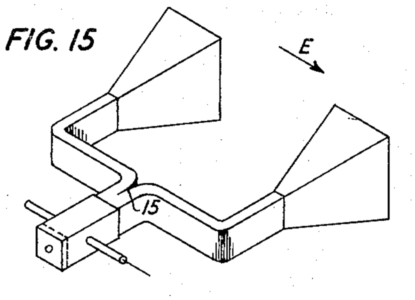
Figure 16:
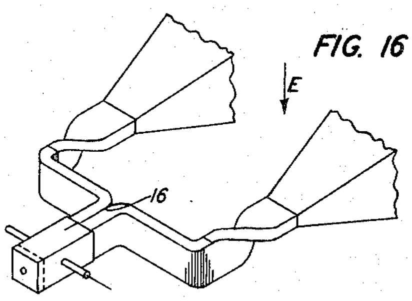

Figs. 15 and 16 show alternate ways of connecting two horns to a single receiver and it will be observed that the two branch circuits are consolidated into a single one, the $a$ dimension of which is equal to the sum of the $a$ dimensions of the two branches, making use of the principles described in connection with Fig. 5. The vestigial partition at 15 of Fig. 15 may be continued into the larger guide as far as desired, as at 16 of Fig. 16.

While in each of Figs. 13 to 16 my invention is shown as applied to horns, it is to be understood that they may be applied in other wave guide systems, such, for example, as systems in which the metallic guides continue indefinitely to any desired points; or the system may comprise a combination of such electrically long guides with one or more horns, the branching always being designed to give impedance matching, that is, to keep the reflection losses to substantially zero.

Also, while the horns of Figs. 13 to 16 are shown of a definite form, it is to be understood that either as radiators or receivers, they may take on other forms. For example, an open-end wave guide of rectangular cross-section will radiate or receive a considerable amount of power in itself. Its ability to transmit or receive, both as to magnitude and as to directivity, can be appreciably improved by such means as are shown in Figs. 17 and 18. In Fig. 17 two wires are shown projecting outward from the end of the guide section. A plurality of wires obviously would represent a further improvement. The structure of Fig. 18 would show a further gain both in magnitude and directivity and it is apparent that such structures represent intermediate stages of progression toward the more formal horns shown in Figs. 13 to 16.

While the individual horns of the latter type may be designed for electrical smoothness and optimum gain, it is evident that a wide variety of horns may be used. One form which is suitable is that in which the horn is rectangular in cross-section, the horn being so faired that the quantity $$Z=\frac{a}{b\sqrt{1-v_1^2}}$$

is the same for all points along the horn and the throat comes down smoothly to the cross-section of the succeeding guide section. Such a horn is shown in Fig. 19 which also shows that the taper may be continued for some distance beyond the horn proper into the connecting guide section, making use of such an element as that of Fig. 10. Indeed, in some cases there would be no point where one would say the horn ends and the guide begins. Furthermore, this element may be given a bend or a twist or path for the purposes described above. Also, the values of $a$ and $b$ may be such that the characteristic impedance of the horn matches as closely as desired that of free space. Where the flaring passage is curved, as illustrated in Fig. 19, there is a tendency for the desired transverse electric waves to be partially converted in the passage into waves of undesired character including waves of higher order, transverse magnetic waves, and waves having an electric field component normal to the plane of the curve. In certain of the horn arrays disclosed herein (as in Fig. 30 e. g.) two such horns are arranged as a pair with opposite directions of curvature such that the waves of undesired character combine in opposing phase relationship and thereby tend to cancel one another.

Finally, while the horns of Figs. 13 to 15 are shown as of relatively short length this restriction is not necessary for, as indicated by Fig. 16, the horns may be continued forward till they coalesce into a smaller number of horns.

In each of Figs 13 to 16 a receiving device is indicated. It is to be understood that this showing is representative of a variety of arrangements. Thus, the receiver may be a crystal detector which demodulates the high frequency wave directly to signal frequency. On the other hand, it may be a section of coaxial cable by which the high frequency wave may be transmitted to some more remote point for detection. Still further, it may be a detecting device which will demodulate down to an intermediate frequency, such as 30 megacycles, whereupon the resulting wave may be amplified and treated as desired for further demodulation or for further transmission, all in a manner now understood in the art.

Figure 21:
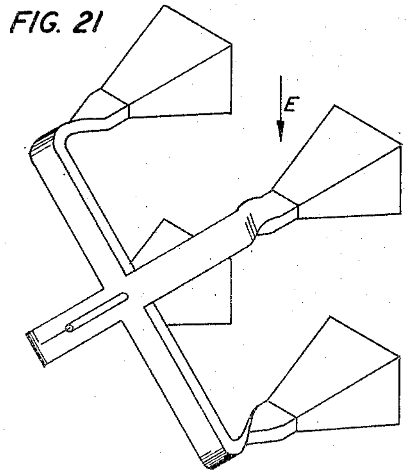
Figure 20:
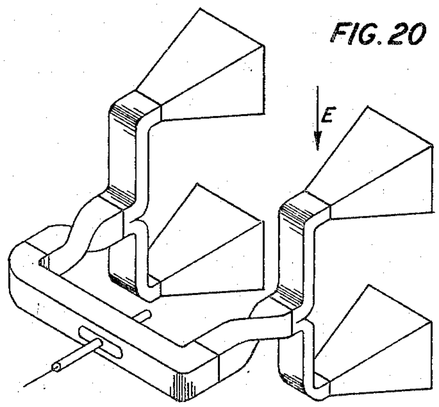

Figs. 20 to 24 show extensions of my invention to an array of four horns. The four shown in Fig. 20 may be considered as a combination of two pairs, the horns in each pair connected as in Fig. 15. Their respective outputs are then combined in accordance with the general scheme shown in Fig. 14. Fig. 21 shows a group of four horns whose respective outputs are each rotated approximately 45 degrees and connected by diagonal guides to a single central receiver. It will be observed that this arrangement is more conservative of elbows and other pieces of apparatus that are reasonably difficult to construct. In this Fig. 21 four 45-degree rotators are needed in place of the two 90-degree rotators of Fig. 20. Still another variation is shown in Fig. 22. These three alternate arrangements shown in Figs. 21 to 22 represent convenient array units which combine to provide added signal. In these cases it may be assumed that the various outputs are combined in the intermediate frequency stage.

In some cases it is possible to permit or even desirable to arrange that an array of radiating units shall possess more directivity in one plane than in another. Figs 23 and 24 show alternate ways by which four horns may be arranged to give such a result.

At times in dielectric wave guide systems of the kind described it will be desirable to join two guide sections of substantially different characteristic impedance. While this will usually introduce some reflection losses, there are cases in which a reasonable loss can be tolerated. Elements for making such connections are shown in Figs. 25 and 26. Here the $b$ dimension remains fixed and the $a$ dimension changes by a factor of 2. It is apparent then that in accordance with Equation 2 the impedance ratio at the two ends is also two to one. In spite of this, I find that the reflection coefficient is still less than 15 per cent and as the length over which the taper occurs is increased, the reflection is reduced.

Reference was made earlier in the specification to the fact that one should be able to obtain parallel or shunt combination of two branches as well as series combination. An arrangement for accomplishing this is shown in Fig. 27 in which two branches are consolidated into a single one. The individual guides to be combined in this particular case with the dimensions shown have a calculated characteristic impedance of about 360 ohms and are connected in such manner that the magnetic vectors along the $b$ dimension add up. Immediately after junction the single element has a dimension $a$ and $2b$ and its characteristic impedance at this point is approximately one-half of that for the individual pipes. By a tapering element in which both $a$ and $b$ contract, it becomes a guide of the same $b$ dimension as the individual branches and of one-half or the $a$ dimension and the wave therefore proceeds down a guide of one-half the impedance of the original individual branch pipes. While this combination does not give as perfect impedance matching as that of the series connection, the unbalance is not so great but that it can be tolerated in some cases.

An example of the simplification resulting from the use of this expedient is shown in Fig. 28. In this figure a pair of horns, each having a characteristic impedance of 360 ohms has been joined by means of the parallel type of connection to a single section having a characteristic impedance of 180 ohms. Two such pairs are then connected in series, thereby returning to the original characteristic impedance of 360 ohms. It is apparent that this process may be continued as often as desired, alternating between the two values of 180 ohms and 360 ohms, thereby avoiding the rather high characteristic impedances that result when successive branches are connected in series indefinitely.

An alternate method of accomplishing a similar result is shown in Fig. 29. The output guides of two adjacent horns are bent and joined in series as in the previous methods. However, each individual connecting pipe is tapered down so that the $a$ dimension becomes one-half as great and the characteristic impedance is halved, after which the series connection is made. After the connection has been effected, the resulting characteristic impedance becomes the original impedance. The process, shown in two steps in Fig. 29, may be continued indefinitely. It is convenient to think of the tapered sections as continuations of the tapered horns to which they were attached, as indicated in Fig. 19.

Another form which my invention may take is illustrated in Fig. 30 in which a pipe, preferably rectangular, and of dimensions $a$ and $b$, with $a$ designating the direction of the electric vector in a transverse electric wave, is divided into a plurality of parallel pipes by suitable partitions 31. Here the partitions are shown as equally spaced so that in each of the branches 32 resulting therefrom the dimension in the direction of the electric vector is equal to $a/n$ where $n$ is the number of branches. The $n$ branches thus formed are here shown as bent into parallel branches, each branch having associated with it a plurality $m$ of horns or equivalent devices, these horns pointing in any desired direction but preferably all in one direction. There is thus obtained a two-dimensional array of $mn$ horns of high directivity suitable for transmission or reception. Irises 33 and pistons 34 should be included in the branches as has been described in the art heretofore. In general, the principles heretofore disclosed would be applied, namely, impedance matching at junctions, bending of branches in the plane of the electric vector, and suitable twisting of any branch, if desired, to change its plane of polarization.

What is claimed is:

1. A system for the radiation or reception of short electromagnetic waves comprising a spaced array of polarization-selective wave radiating-or-intercepting elements, a wave translating device common to all of said radiating-or-intercepting elements, a wave guide of rectangular cross-section having a polarization-selective impedance matching coupling to said translating device, said wave guide having a plurality of distinct separated branches of rectangular cross-section connected individually in impedance matching relation to corresponding ones of said elements, the said elements and the cross-sections of said individually connected branches being oriented to transfer wave energy in phase-aiding relation between the said wave translating device and free space.

2. A system for the radiation or reception of short electromagnetic waves comprising an array of polarization-selective wave radiating-or-intercepting elements, a wave translating device common to all of said radiating-or-intercepting elements, a plurality of main wave guides of rectangular cross-section each branching into a set of impedance-matching branch guides of rectangular cross-section, the said branch guides of each set connecting individually corresponding ones of said radiating-or-intercepting elements in phase-aiding relation with respect to waves guided between the main wave guide of the set and the said elements connected thereto, and the several said main wave guides having a common, impedance-matching, polarization-selective coupling to said common wave translating device.

3. In a system for signaling with short electromagnetic waves, an array of four similar unidirectional electromagnetic horns each having an individual rectangular wave guide of transverse dimensions $a$ and $b$ connected thereto, one pair of said rectangular wave guides branching at one point from a rectangular wave guide of transverse dimensions $2a$ and $b$, and the other pair of said wave guides branching from another point of the said guide of dimensions $2a$ and $b$.

4. A dielectric wave guide system for the radiation or reception of short electromagnetic waves comprising an array of like directed electromagnetic horns connected in pairs and these pairs in turn connected in pairs by rectangular wave guide branches of such cross-sectional dimensions as to operate from a common source or on a common detector without substantial reflection losses at the junctions of branches consolidating the array, certain of the connecting wave guide sections possessing bends to bring them into juxtaposition for joinder, and certain of the said connecting sections being twisted to bring the waves transmitted through the several branches into aiding relation with respect to phase and polarization.

5. A dielectric wave guide system for radiation or reception of short electromagnetic waves comprising an array of four horns all connected together by rectangular hollow-pipe wave guide branches to operate from a common source or on a common detector without reflection losses at the junctions of the branches consolidating the array, certain of said rectangular wave guide branches being twisted about a longitudinal axis to bring about a desired phase relation between wave components transmitted between said common element and the several said horns.

6. In a dielectric wave guide system for TE waves, a junction combining two branches of rectangular hollow-pipe wave guide to a single rectangular guide section without reflection at the junction, the two branches being of transverse dimensions $a$ and $b$, with $a$ in the direction of the electric vector, and the single guide section being of transverse dimensions $2a$ and $b$.

7. A tubular uni-conductor electromagnetic wave guide of rectangular cross-section, said guide being branched, the branch wave guides being divergent from a common branching point, of rectangular cross-section and at the branching point occupying a total cross-sectional area having substantially the same transverse dimensions as the main guide, a corresponding transverse dimension of all of said branch guides being coextensive with one of the transverse dimensions of the said main guide.

8. A structure in accordance with claim 7 in which said branch guides maintain their respective cross-section substantially unchanged as they diverge from each other.

9. A tubular uni-conductor electromagnetic wave guide of rectangular cross-section joined to a plurality of laterally separated branch wave guides of rectangular cross-section without reflection at the junction, the branch wave guides being laterally contiguous at the junction and occupying a total cross-sectional area having substantially the same transverse dimensions as the main guide, each branch guide having a conductive wall that is gradually brought into tangency with a conductive wall of another branch guide, the said tangent walls merging to form a septum of insubstantial thickness which at the junction is parallel to the axis of the main guide.

10. A plurality of distinct tubular uni-conductor electromagnetic wave guides joined in series branching relation to a main wave guide with respect to the guided transmission of transverse electric waves, said branch guides having a common wall of negligible thickness at the junction of said guides, said common wall extending across the interior of the main guide in a plane perpendicular to the electric vector of transverse electric waves therein, said branch guides having respective impedances to transverse electric waves which together equal the impedance of said main guide and said branch guides being free of substantial reflection-producing changes in size and direction near said junction.

11. In a dielectric wave guide system for transverse electric waves, a junction combining two branches of a hollow metal rectangular guide to a single rectangular guide section, without reflection at the junction, the two branches being of transverse dimensions $a$ and $b$, with $a$ in the direction of the electric vector, and the single guide section being of transverse dimensions $2a$ and $b$, at least one of the branches being curved to change direction gradually but being curved in the plane of the electric vector only.

12. In a dielectric wave guide system, a hollow metal rectangular wave guide of cross-sectional dimensions $a$ and $b$ with $a$ less than $b$ and with the plane of polarization of the electric vector in the direction $a$, means for rotating the plane of polarization of the wave comprising a section of said guide gradually twisting about a longitudinal axis, the total twist being equal to the desired degree of rotation.

13. A hollow single-conductor electromagnetic wave guide of elongated cross-section that is twisted about a longitudinal axis to change the direction of polarization of a wave transmitted therethrough, the twist being gradual so as to avoid excessive reflection of the said wave.

14. In a high frequency transmission system, a tubular uni-conductor electromagnetic wave guide of elongated substantially rectangular cross-section having its longer cross-sectional dimension perpendicular to the direction of the transverse electric vector of the guided wave, a section of said guide having a gradual substantially reflectionless twist about a longitudinal axis, the cross-section of said twisted section being substantially uniformly the same as that of another section of said guide.

15. In a dielectric wave guide system, two branches of rectangular hollow-pipe wave guide of transverse dimensions $a$ and $b$ and of characteristic impedance Z, said branch guides being spaced apart from each other but merging at a junction point into a single rectangular hollow-pipe wave guide of transverse dimensions $2a$ and $b$, and of characteristic impedance 2Z.

16. The combination of claim 15 characterized in that the $a$ dimension is so small that the pipe cannot sustain guided electromagnetic waves with the electric vector along the $b$ dimension.

17. In a dielectric wave guide system, two electromagnetic horns of rectangular cross-section, the throat of each having transverse dimensions

*a* and *b* and possessing characteristic impedance Z, means for joining these into a single rectangular guide of transverse dimensions 2*a* and *b* and of characteristic impedance 2Z.

18. In a high frequency transmission system, two similarly oriented electromagnetic horns of rectangular cross-section, the throat of each having unequal transverse dimensions, a pair of hollow rectangular metal wave guide branches having the same said transverse dimensions, each connected at one end to a corresponding one of said horn throats and each at its other end merging with the other branch guide into a single rectangular guide, at least one of said guides including a twisted section.

19. In a system for conveying polarized electromagnetic waves with low loss between a first point and a plurality of other points, the polarized wave to have a predetermined orientation at each of said points, a main tubular uni-conductor electromagnetic wave guide extending from said first point, said main guide being subdivided into a plurality of branch guides having a combined impedance substantially the same as the impedance of the main guide, each of said branch guides extending to an individually corresponding one of said other points, at least one of said branch guides having a bend therein, said guides being polarization-selective, and at least one of said guides being twisted whereby each such bend lies in a predetermined plane with reference to the orientation of a polarized wave passing therethrough.

20. In a dielectric wave guide system for TE waves, a rectangular hollow metal wave guide section of transverse dimensions *a* and *b* with the electric vector in the *a* direction, means for changing the direction of the guide section without loss to any desired direction comprising a twist and a bend in the section, the bending at any point being in the plane of the electric vector only.

21. In a dielectric wave guide system for transverse electric waves, means for consolidating or dispersing the energy in a plurality of branch guides, said means comprising a rectangular wave guide section of dimensions *a* and *b*, with *a* in the direction of the electric vector, at least one septum dividing the rectangular guide into *n* sections in the *a* direction only, each section then being continued as a separate diverging branch.

22. In a dielectric wave guide system for transverse electric waves, means for consolidating or dispersing the energy in a plurality of branch guides, said means comprising a rectangular wave guide section of dimensions *a* and *b*, with *a* in the direction of the electric vector, at least one septum dividing the rectangular guide into *n* sections in the *a* direction, each section then being continued as a separate branch, the branches being so bent as to be adjacent and parallel to each other, and each said branch in turn being branched into *m* subbranches to form an array of *mn* branches.

23. The combination of claim 22 including a horn connected to each of the *mn* subbranches for directive radiation or reception of short electromagnetic waves.

24. In a dielectric wave guide system for TE waves, a junction combining two branches of rectangular guide to a single rectangular guide section without reflection at the junction, the two branches being of transverse dimensions *a* and *b* with *a* in the direction of the electric vector and the single guide section being of transverse dimensions *a* and 2*b*.

25. In a dielectric wave guide system for TE waves, a tapered section of wave guide joining two branches of rectangular guide to a single rectangular guide without reflection at the junction, the two branches being of transverse dimensions *a* and *b* with *a* in the direction of the electric vector and the single guide being of transverse dimensions *a*/2 and *b*, said tapered section having the same transverse dimensions as said single guide at its junction therewith and transverse dimensions *a* and 2*b* at its junction with said two branches guides.

26. A dielectric wave guide system for radiation and reception of short electromagnetic waves by means of horns, a pair of horns, a junction element extending from the throat of each horn, each said junction element comprising a rectangular pipe of dimensions *a* and *b* at the one end and possessing a characteristic impedance Z, the junction element tapering to the dimensions *a*/2 and *b* at the other end and possessing a characteristic impedance one-half of that at the first end, the smaller ends being brought together into a single pipe of the same dimensions and characteristic impedance as the throat ends of the junction elements.

27. A horn radiator having rectangular mouth and throat apertures and being curved along its axis, means for energizing said horn with a wave of a polarization parallel to the plane in which the axis of said horn lies and means for suppressing radiant energy waves having a component of polarization normal to said plane caused by the curvature of said horn.

28. A wave guide having rectangular mouth and throat apertures of different sizes and its axis being curved in a vertical plane, means for energizing said guide with a wave having a component of electric field in a direction parallel to the axial plane of said guide and normal to the direction of travel of said wave within said guide and means for suppressing radiant energy waves having a component of electric field normal to said plane caused by the curvature of said guide.

29. An electromagnetic horn radiator comprising a plurality of curved tapered horns and means for supplying wave energy of desired characteristics to all of said horns in such relationship that the energy from all of said horns is additive in a predetermined direction, said horns being arranged in pairs with the curvatures of the horns of each pair being in opposite directions whereby waves of an undesired characteristic caused by said curvature are neutralized.

30. An electromagnetic horn antenna system comprising at least one pair of curved tapered horns positioned to radiate or receive energy in a common predetermined direction, transducer means common to said horns for supplying electromagnetic wave energy of desired characteristics concurrently to all of said horns or for receiving such energy concurrently from all of said horns, the said paired horns being arranged with the curvatures thereof in opposite directions.

31. A wave guide having rectangular mouth and throat apertures of different sizes and being curved along its axis, exciting-or-receiving means coupled to the throat aperture in energy transfer relation with a wave having a component of electric field in a direction parallel to the axial plane of said guide, and means suppressing transmission of waves having a component of electric field normal to said plane caused by curvature of said guide.

GEORGE C. SOUTHWORTH.

REFERENCES CITED

The following references are of record in the file of this patent:

UNITED STATES PATENTS

| Number | Name | Date |
|---|---|---|
| 962,574 | Kaufman | June 28, 1910 |
| 999,408 | Smith | Aug. 1, 1911 |
| 2,129,669 | Bowen | Sept. 13, 1938 |
| 2,129,714 | Southworth | Sept. 13, 1938 |
| 2,206,683 | Wolff | July 2, 1940 |
| 2,206,923 | Southworth | July 9, 1940 |

| Number | Name | Date |
|---|---|---|
| 2,207,845 | Wolff | July 16, 1940 |
| 2,283,935 | King | May 26, 1942 |
| 2,461,005 | Southworth | Feb. 8, 1949 |

FOREIGN PATENTS

| Number | Country | Date |
|---|---|---|
| 840,992 | France | May 8, 1939 |

OTHER REFERENCES

Proc. IRE, Dec. 1938, vol. 26, No. 12, "Rectangular hollow-pipe radiators," by Barrow and Green, pp. 1512 to 1514.

Proc. IRE, January 1939, "Theory of the electromagnetic horn," by Barrow and Chu, pp. 51 to 60.

Proc. IRE, March 1940, "Multiunit electromagnetic horns," by Barrow and Shulman, page 131.